United States Patent [19]

Kawamura et al.

[11] 4,277,275
[45] Jul. 7, 1981

[54] METHOD FOR FABRICATING LIQUID CRYSTAL DISPLAY ELEMENT

[75] Inventors: Hiromitsu Kawamura; Tokuyoshi Nakajima; Yoshimichi Shibuya, all of Mobara, Japan

[73] Assignee: Hitachi, Ltd., Tokyo, Japan

[21] Appl. No.: 74,148

[22] Filed: Sep. 10, 1979

[30] Foreign Application Priority Data

Sep. 8, 1978 [JP] Japan ............................. 53-109640

[51] Int. Cl.³ ............................................. C03C 27/00
[52] U.S. Cl. ............................................. 65/43; 65/58; 65/59 A
[58] Field of Search ............................. 65/43, 58, 59 A

[56] References Cited

U.S. PATENT DOCUMENTS

| | | | |
|---|---|---|---|
| 3,061,664 | 10/1962 | Kegg | 65/43 X |
| 3,862,830 | 1/1975 | Stern | 65/58 |
| 3,960,534 | 6/1976 | Oates | 65/43 |

*Primary Examiner*—Arthur D. Kellogg
*Attorney, Agent, or Firm*—Craig and Antonelli

[57] ABSTRACT

A method for fabricating a liquid crystal display element is disclosed, in which two substrates to be provided with electrodes are prepared, at least one of the substrates having a specific portion extending outwardly beyond the peripheral edge of the other substrate when they are assembled. A sealing material layer is formed on the surface provided with the electrode of the substrate, which layer includes a specific section extending along the peripheral edge of the specific portion and being formed on the substrate having the specific portion. The substrates are disposed one above the other through the sealing material layer, with the peripheral edge of one of the substrates corresponding to the peripheral edge of the specific portion of the other substrate being positioned within the range of the width of the specific section of the sealing material layer. The thus assembled substrates and sealing material layer are heated.

17 Claims, 17 Drawing Figures

METHOD FOR FABRICATING LIQUID CRYSTAL DISPLAY ELEMENT

FIELD OF THE INVENTION

The present invention relates to a method for fabricating a liquid crystal display element, and more particularly to a method for sealing a peripheral portion of a gap between two substrates which face each other with a predetermined spacing maintained therebetween, to form an envelope filled with a liquid crystal material.

BRIEF DESCRIPTION OF THE DRAWINGS

FIGS. 3A to 3C are views for explaining a method for fabricating a liquid crystal display element, especially for forming a sealing portion thereof according to an embodiment of the present invention, in which FIG. 3A is a cross-sectional view for showing a state immediately before an upper substrate being disposed over a lower substrate through a sealing material layer, and FIGS. 3B and 3C are partially sectional views for showing the shape of the sealing material layer or sealing portion.

DESCRIPTION OF THE PRIOR ART

Figure 1:
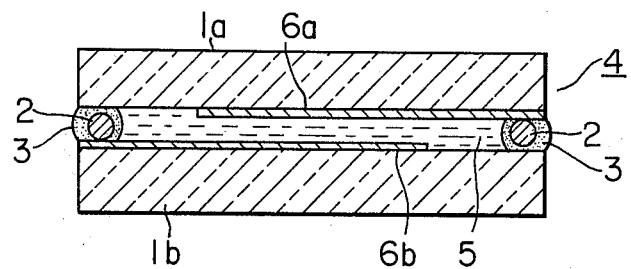
FIG. 1 is a sectional view showing an example of conventional liquid crystal display elements.

In general, a liquid crystal display element has such a structure as shown in FIG. 1. A pair of substrates 1a and 1b, at least one of which is made of a transparent material such as glass, are disposed facing each other with their peripheral portions combined by a sealing material 3 containing a spacer 2, to form an envelope 4 filled with a liquid crystal 5. The inner surfaces facing each other of the substrates 1a and 1b are provided with electrodes 6a and 6b having predetermined patterns, respectively. Each of the electrodes is usually formed of a transparent conductive film which is made of indium oxide, tin oxide, or a mixture of these oxides. The optical property of the liquid crystal 5 is varied through application of a voltage between the electrodes 6a and 6b, and thus a predetermined display pattern can be recognized by viewing the element from the outside of the transparent substrate. The sealing material 3 for sealing the gap between the substrates 1a and 1b at the peripheral portions of the substrates is usually made of an inorganic, low-melting-point glass, in order to obtain the airtight sealing which is not affected by moisture, water or the like. However, the low-melting-point glass is very weak in mechanical strength, and moreover it is difficult to obtain a low-melting-point glass material having a coefficient of thermal expansion nearly equal to that of the substrates 1a and 1b. Therefore, the conventional liquid crystal display element having the above-mentioned structure has a drawback that the sealing portion of the element is readily broken by thermal shock such as rapid heating and cooling.

Figure 2A:
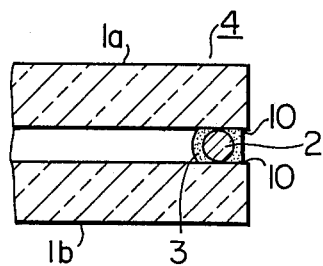
FIGS. 2A, 2B and 2C are partially sectional views for showing the form of respective sealing portions of liquid crystal display elements fabricated in conventional methods.
Figure 2B:
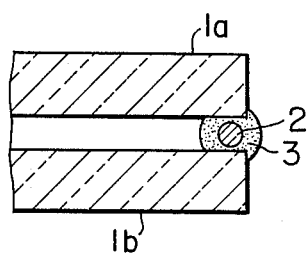
Figure 2C:
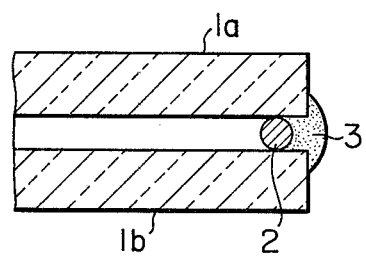

Various methods have been employed to seal the peripheral portion of the gap between the substrates 1a and 1b with the sealing material 3. One of such methods is such that the sealing material layer 3 is provided on the surface of one of the substrates through the silk-screen process, the other substrate is then laid on this substrate through the sealing material 3, and the substrates and sealing material thus combined are heated to sinter the sealing material and to integrate the substrates and sealing material, so that a sealing portion having such sectional shape as shown in FIG. 2A or 2B is formed. In another method, the substrates 1a and 1b are disposed facing each other with the spacer 2 interposed therebetween, the substrates are applied at their peripheral portions with the sealing material 3, these substrates and sealing material are then heated to integrate them, so that a sealing portion having such a sectional shape as shown in FIG. 2C is formed. However, in the shape shown in FIG. 2A, since the sealing material 3 does not protrude from the fringes of the substrates, when the envelope 4 is subjected to mechanical stress or thermal shock, any stress is concentrated at an edge portion 10 of a junction between the substrates and the sealing material, and hence there occurs some danger of a fracture being started from the edge portion 10. In the shape shown in FIG. 2B, which results from a large amount of sealing material being used, since the sealing material 3 protrudes from the peripheral edges of the substrates and the formation of such an edge portion 10 as shown in FIG. 2A is prevented, the concentration of stress is relieved. However, it is easy for the sealing material 3 protruding from the peripheral edges of the substrates to impact other bodies in close proximity during handling the envelope or the element, and hence the sealing portion is readily damaged due to such impacts. In addition thereto, since the spacing between the electrodes 6a and 6b is made larger, the response time of the liquid crystal 5 becomes long, and therefore the characteristic of the element is degraded. In the shape shown in FIG. 2C, since the inside of the envelope 4 is deficient in the sealing material 3, the bonding (or adhesive) area of the substrates with the sealing material is small and therefore the element is inferior in mechanical strength. Further, since the sealing material 3 protrudes from the peripheral edges of the substrates, the sealing portion is readily subjected to mechanical shocks and hence damage, similarly to the case of FIG. 2B. The prior art methods described referring to FIGS. 2A and 2B and FIG. 2C are disclosed for example in Japanese Utility Model Application Laid-open No. 70580/73 and Japanese Patent Application Laid-open No. 90199/73.

SUMMARY OF THE INVENTION

An object of the present invention is to provide a method for fabricating a liquid crystal display element in which an envelope or a hermetically sealed vessel for forming a space filled with a liquid crystal material has a large mechanical strength at its sealing portion, to solve the above-mentioned drawbacks.

In order to attain the above object, according to the present invention, there is provided a method for fabricating a liquid crystal display element, which method comprises the steps of preparing first and second substrates, each having a plan surface of a predetermined shape with a peripheral edge, and at least one of said substrates having at least one specific portion extending outwardly beyond the peripheral edge of the other substrate when the substrates are assembled, the specific portion having a peripheral edge with a substantial length; forming an electrode having a predetermined pattern on the surface of each of the substrate; forming on at least one of the surfaces provided with the electrodes of the substrates, a sealing material layer having a predetermined width and height and extending along the peripheral edges of the substrates, the sealing material layer including a specific section extending along the peripheral edge of said specific portion, the specific section being formed on the substrate having said specific portion; disposing the substrates one above the other through the sealing material layer in a predetermined relative position, with the surfaces provided with the electrodes facing each other, and with the peripheral edge of one of the substrates corresponding to the peripheral edge of the specific portion of the other substrate being positioned within the range of the predetermined width of the specific section of the sealing material layer, to form a substrate assembly; heating the substrate assembly; and injecting liquid crystal into a space defined by the substrates and the sealing material layer.

DESCRIPTION OF THE PREFERRED EMBODIMENTS

Preferred embodiments of the present invention will be described with reference to the accompanying drawings.

Figure 3A:
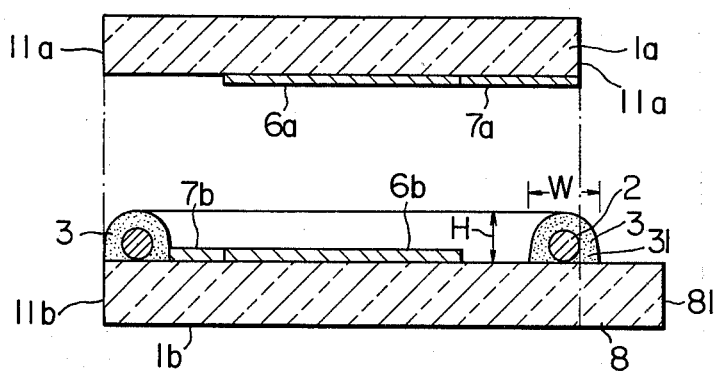
Figure 3B:
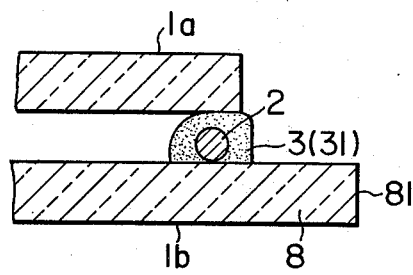

Referring to FIG. 3A, two substrates 1a and 1b are prepared. The substrate 1a has a peripheral edge 11a and the substrate 1b has a portion 8 which extends outwardly beyond the edge 11a of the substrate 1a when the substrates are assembled in a predetermined relative position. The substrate 1b has a peripheral edge 11b including an edge 81 of the portion 8. The portion 8 and the edge 81 are called here specific portion and specific edge. The substrates 1a and 1b are disposed one above the other as shown in FIG. 3B with a sealing material layer 3 interposed therebetween. On the facing surfaces of the substrates are formed electrodes 6a and 6b having predetermined patterns in a conventional method. The electrodes 6a and 6b are provided with respective leads 7a and 7b for connecting the electrodes to a power supply (not shown). At least one of the substrates is made of a transparent material such as glass, and each of the electrodes is formed of a transparent conductive film made of such as the previously mentioned material.

The sealing material layer 3 having a predetermined width W and height H is formed on one or both of the surface provided with the electrode of the substrate 1a and the surface provided with the electrode of the substrate 1b, along the peripheral edge of the substrate, with a specific section 31 of the sealing material layer 3 corresponding to the pair of the specific edge 81 of the substrate 1b and the edge, corresponding to the specific edge 81, of the substrate 1a being formed on the substrate 1b having the specific portion 8. The specific section 31 of the sealing material layer 3 is formed at a position such that, when the substrates 1a and 1b are assembled in a predetermined relative position, the edge of the substrate 1a corresponding to the specific edge 81 is located within the range of the width W of the specific section 31 of the sealing material layer 3. If the edge of the substrate 1a corresponding to the specific edge 81 is positioned too inwardly within the range of the width W, only a small amount of sealing material exists between the substrates 1a and 1b, and thus bonding area between the specific section 31 of the sealing material layer 3 and the substrate 1a becomes small, which will result in poor adhesive property and difficulty of maintaining a predetermined spacing between the substrates. Therefore, it is preferable to arrange the specific section 31 of the sealing material layer 3 so that the edge of the substrate 1a corresponding to the specific edge 81 is positioned outwardly from the center of the width W within the above-mentioned range.

Low-melting-point glass is used as the sealing material. Powders of low-melting-point glass are worked into a paste, which is applied on the surface of the substrate through the silk-screen process or the like to form the sealing material layer 3. The sealing material layer 3, as shown in FIG. 3A, may contain a spacer 2 which serves to maintain a predetermined spacing between the substrates 1a and 1b. In this case a rod or several spheres are previously contained as the spacer 2 in the sealing material and then the sealing material containing the rod or spheres is applied on the surface of the substrate.

Figure 3C:
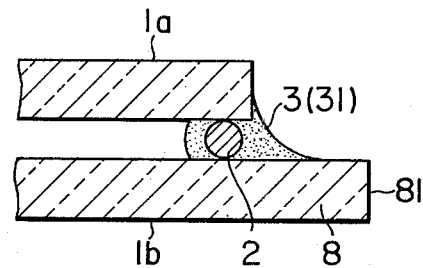

Next, as shown in FIG. 3B, the substrate 1a is placed through the sealing material layer 3 on the substrate 1b in a predetermined relative position. The pasty sealing material is soft, and therefore is deformed to some extent, as shown in FIG. 3B. The substrates 1a and 1b and the sealing material layer 3 thus combined, are heated to sinter the sealing material layer 3 and to integrate the sealing material and the substrates 1a and 1b. An envelope thus obtained has a sealing portion formed of the sealing material layer 3 including the section formed of the specific section 31 having such a shape as shown in FIG. 3C, which does not include a structure such as causing concentration of stress. Further, between the sealing material layer and each of the substrates is assured a large bonding area, which provides a great strength for mechanical or thermal shock. Furthermore, because of the specific portion 8, the sealing material of the section 31 does not extend beyond the edge 81. Accordingly, this sealing section 31 has no chance to become in contact with bodies in close proximity during handling the envelope or element, and therefore there is no fear of the sealing portion being subjected to mechanical shock. A predetermined spacing between the substrates 1a and 1b is maintained by the spacer 2. However, in case the spacer 2 is not employed, the predetermined spacing is assured by only the sealing material. The electrodes 6a and 6b are omitted in FIGS. 3B and 3C for brevity's sake.

Figure 4:
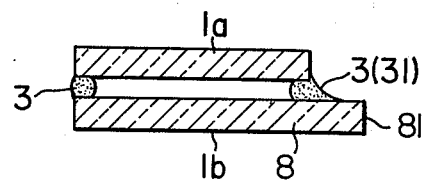
FIGS. 4, 5 and 6 are sectional views for showing the form of envelopes of liquid crystal display elements fabricated according to embodiments of the present invention.

FIG. 4 shows a cross section of the envelope fabricated in the above-mentioned method according to the present invention. In this envelope, the other sections of the sealing portion than that formed by the specific section 31 of the sealing material layer have the same structure as those of conventional envelopes, for example, such as shown in FIG. 2B. Accordingly, these other sections of the sealing portion have the same mechanical and thermal strength as those of conventional envelopes, but the sections of the sealing portion formed by the specific section 31 can be improved in mechanical and thermal strength.

Figure 5:
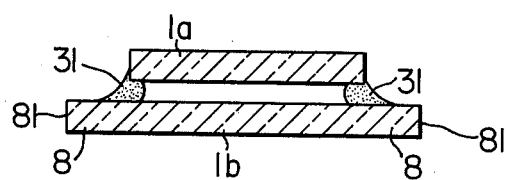
Figure 6:
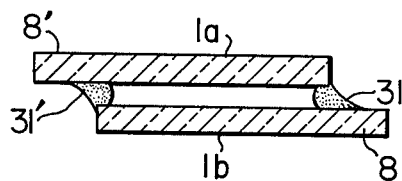

FIG. 5 shows a cross section of another envelope fabricated according to another embodiment of the present invention in which the substrate 1b has the plurality of specific portions 8 or the specific portion 8 along its entire peripheral edge. FIG. 6 shows a cross section of another envelope fabricated according to another embodiment of the present invention in which the substrate 1a has the specific portion 8' as well as the substrate 1b has the specific portion 8. In this case, the specific section 31' of the sealing material layer is formed on the substrate 1a. The envelopes shown in FIGS. 5 and 6 are far superior in mechanical and thermal strengths to that shown in FIG. 4.

Figure 7:
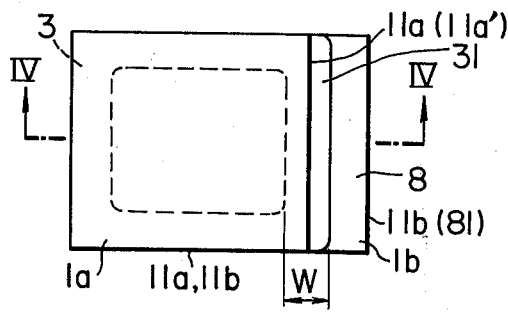
FIG. 7 is a plan view of substrates disposed one over the other through a sealing material layer for explaining an embodiment of the present invention.

Various plan shapes of liquid crystal display elements or various display surfaces will be required by users. Therefore, various shapes will be necessary for the plan surface of the substrate to be prepared. FIG. 7 is a plan view of the assembly of the substrates 1a and 1b each having a plan surface of a substantially rectangular shape for providing an envelope having a rectangular plan surface and hence a rectangular display surface. The substrate 1b has the specific portion 8 with the specific edge 81, which extends outwardly beyond the peripheral edge 11a of the substrate 1a. The specific section 31 of the sealing material layer 3 is formed so that the edge 11'a of the substrate 1a corresponding to the specific edge 81 is located within the range of the width W of the specific section 31 and preferably outwardly from the center of the width W within such range, as shown in the Figure. The envelope obtained through heat processing of the assembly has a cross section taken along the line IV—IV such as shown in FIG. 4.

Figure 8:
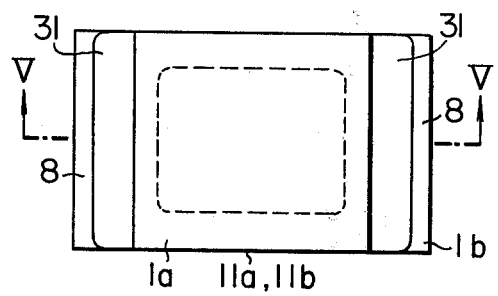
FIGS. 8, 9, 10, 11 and 12 are plan views of envelopes fabricated according to embodiments of the present invention.
Figure 9:
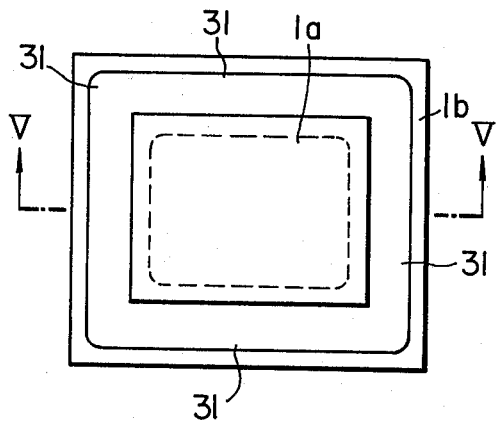

In FIG. 7, the substrate 1b has the specific portion along one of the four sides of the rectangular shape. However, it is of course possible to provide the plurality of specific portions along plural sides of the rectangular shape and to form the plurality of specific sections of the sealing material layer. FIG. 8 is a plan view of an envelope fabricated with use of the substrate 1b having the specific portions 8 along two parallel sides of the rectangular shape. FIG. 9 is a plan view of another envelope fabricated with use of the substrate 1b having the specific portion along the four sides, i.e. the entire peripheral edge thereof. These envelopes have a cross section taken along the line V—V such as shown in FIG. 5.

Figure 10:
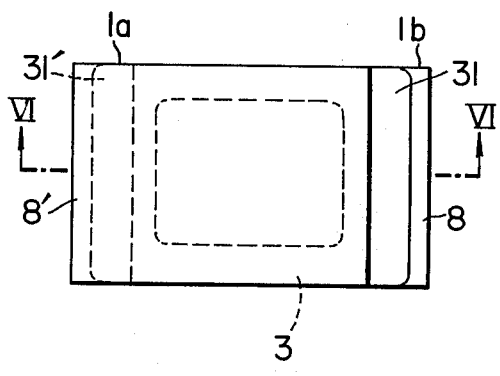
Figure 11:
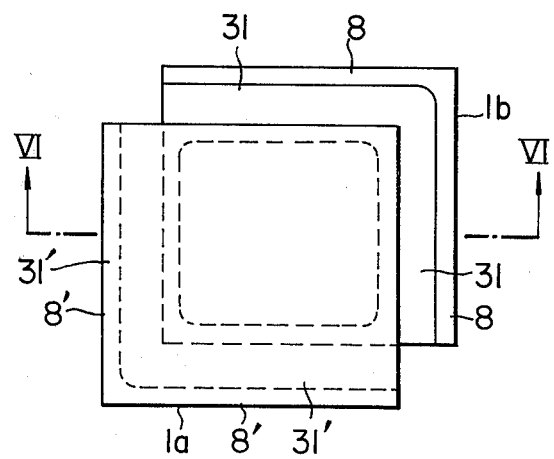

FIGS. 10 and 11 are plan views of other envelopes fabricated from the assembly of the substrate 1b having the specific portions 8 and the substrate 1a having the specific portions 8'. These envelopes have a cross section taken along the line VI—VI such as shown in FIG. 6.

Figure 12:
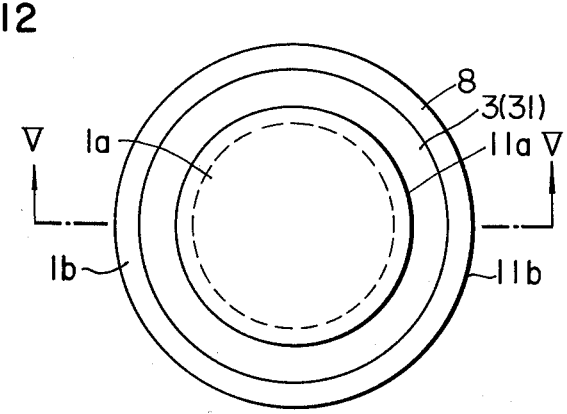

FIG. 12 shows in plan view another envelope fabricated from the assembly of the substrates 1a and 1b each having a circular plan surface, for providing a circular display surface of a display element. The substrate 1b has a larger diameter than that of the substrate 1a and hence has the specific portion 8 extending the edge 11a of the substrate 1a, along the entire peripheral edge 11b. The cross section of this envelope is such as shown in FIG. 5 when taken along the line V—V.

In the embodiments described in FIGS. 8 and 10, the mechanical and thermal strengths of the envelope can be more improved than the embodiment shown in FIG. 7. In the embodiments described referring to FIGS. 9, 11 and 12, since the mechanical and thermal strengths can be enhanced in the entirety of the sealing portion, a remarkable effect can be attained according to the invention. The embodiment of FIG. 11 has an advantage such that the envelope can be fabricated of two substrates 1a and 1b of the same size.

An opening is previously provided in the sealing material layer 3 at an appropriate position to introduce a liquid crystal material into the inside of the envelope. When the introduction of liquid crystal is completed, the opening is sealed with low-melting-point glass or solder.

In order to compare the thermal strength of a conventional liquid crystal display element, the sealing portion of which has such a shape as shown in FIG. 2A, with that of a liquid crystal display element fabricated according to the embodiment described with reference to FIG. 8 or 10, each of these liquid crystal display elements was dipped alternately in cold and hot water at a cycle of 30 seconds, to effect a heat cycle test on these elements. A difference in temperature between cold water and hot water was made successively large in the order of 30°, 40°, 50°, 60°, 70°, 80°, 90° and 100° C. and twenty cycles of alternate dipping were conducted for these liquid crystal display elements at each of the above temperature differences. These liquid crystal display elements were about 20 mm long and about 20 mm wide in plan view, and the substrates of these elements were about 0.7 mm thick.

Figure 13:
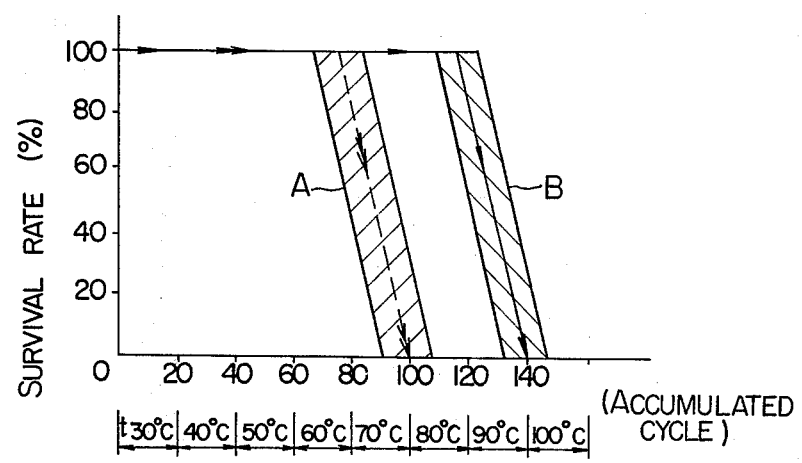
FIG. 13 is a graph showing a difference in thermal strength between liquid crystal display elements fabricated according to an embodiment of the present invention and in a conventional method.

FIG. 13 shows survival rates of liquid crystal display elements which had no crack at their sealing portions in the heat cycle test. In FIG. 13, reference character A designates the survival rate of the conventional liquid crystal display element and B that of the liquid crystal display element according to the present invention. As is evident from FIG. 13, cracks begin to be generated in the range of temperature difference of 60° C. in the heat cycle in the conventional liquid crystal display element. On the other hand, in the liquid crystal display element according to the present invention, cracks begin to be generated in the range of temperature difference of 80° C. in the heat cycle. The above results of the heat cycle test clearly show that the thermal strength of the sealing portion can be remarkably improved by the present invention.

In the above-mentioned embodiments, there has been described a case where low-melting-point glass is used as the sealing material. The present invention is not limited to such a case, but can attain the same effect in a case where epoxy adhesive is employed as the sealing material.

We claim:

1. A method for fabricating a liquid crystal display element having a first substrate, a second substrate arranged facing the first substrate, and a sealing material disposed at peripheral portions of the substrates with at least a part thereof being interposed between the substrates, for maintaining a predetermined spacing between the substrates and forming a hermetically sealed envelope together with the substrates, said method comprising the steps of:

preparing said first and second substrates, each having a plan surface of a predetermined shape with a peripheral edge, and at least one of said substrates having at least one specific portion extending outwardly beyond the peripheral edge of the other substrate when the substrates are assembled, said specific portion having a peripheral edge with a substantial length;

forming an electrode having a predetermined pattern on the surface of each of the substrate;

forming, on at least one of the surfaces provided with the electrodes of the substrates, a sealing material layer having a predetermined width and height and extending along the peripheral edges of the substrates, said sealing material layer including a specific section extending along the peripheral edge of said specific portion, said specific section being formed on the substrate having said specific portion;

disposing the substrates one above the other through the sealing material layer in a predetermined relative position, with the surfaces provided with the electrodes facing each other, and with the peripheral edge of one of the substrates corresponding to the peripheral edge of the specific portion of the other substrate being positioned within the range of said predetermined width of said specific section of the sealing material layer, to form a substrate assembly;

heating said substrate assembly to cause the sealing material layer to extend over a portion of the peripheral edge of the other substrate and to extend to a position not beyond the peripheral edge of the one substrate; and injecting liquid crystal into a space defined by the substrates and the sealing material layer.

2. A method as claimed in claim 1, wherein said sealing material layer is formed so that the peripheral edge of the other of the substrates corresponding to the peripheral edge of the specific portion of the one substrate is positioned outwardly from the center of said predetermined width of said specific section of the sealing material layer within the range of said predetermined width.

3. A method as claimed in claim 1 or 2, wherein said sealing material layer forming step includes a step of containing, in the sealing material, a spacer member for ensuring said spacing between the substrates.

4. A method for fabricating a liquid crystal display element having a first substrate, a second substrate arranged facing the first substrate, and a sealing material disposed at peripheral portions of the substrates with at least a part thereof being interposed between the substrates, for maintaining a predetermined spacing between the substrates and forming a hermetically sealed envelope together with the substrates, said method comprising the steps of:

preparing said first and second substrates, each having a plan surface of a substantially rectangular shape with four periphral sides, at least one of said substrates having at least one specific side of said four sides positioned outwardly from a corresponding one of said four sides of the other substrate corresponding to said specific side so that said one substrate has a specific portion extending outwardly beyond said corresponding side of said other substrate, when the substrates are assembled;

forming an electrode having a predetermined pattern on the surface of each of the substrates;

forming, on at least one of the surfaces provided with the electrodes of the substrates, a sealing material layer having a predetermined width and height and extending along the peripheral sides of the substrates, said sealing material layer including a specific section extending along said specific side, said specific section being formed on the substrate having said specific portion;

disposing the substrates one above the other through the sealing material layer in a predetermined relative position, with the surfaces provided with the electrodes facing each other, and with said corresponding side being positioned within the range of said predetermined width of said specific section of the sealing material layer, to form a substrate assembly;

heating said substrate assembly to cause the sealing material layer to extend over a portion of the peripheral edge of the other substrate and to extend to a position not beyond the peripheral edge of the one substrate; and injecting liquid crystal into a space defined by the substrates and the sealing material layer.

5. A method as claimed in claim 4, wherein said sealing material layer is formed so that said corresponding side is positioned outwardly from the center of said predetermined width of said specific section of the sealing material layer within the range of said predetermined width.

6. A method as claimed in claim 4 or 5, wherein the first substrate has two parallel ones of the four sides as said specific sides.

7. A method as claimed in claim 4 or 5, wherein the first substrate has the four sides as said specific sides.

8. A method as claimed in claim 4 or 5, wherein the first substrate has a selected one of the four sides as said specific side, and the second substrate has, as said specific side, one of the four sides corresponding to the side of the first substrate parallel to said selected one side.

9. A method as claimed in claim 4 or 5, wherein the first substrate has two selected adjacent ones of the four sides as said specific sides, and the second substrate has, as said specific sides, two adjacent sides of the four sides corresponding to the two sides of the first substrate other than said selected two sides.

10. A method as claimed in claim 4 or 5, wherein said sealing material layer forming step includes a step of containing, in the sealing material, a spacer member for ensuring said spacing between the substrates.

11. A method for fabricating a liquid crystal display element having a first substrate, a second substrate arranged facing the first substrate, and a sealing material disposed at peripheral portions of the substrates with at least a part thereof being interposed between the substrates, for maintaining a predetermined spacing between the substrates and forming a hermetically sealed envelope together with the substrates, said method comprising the steps of:

preparing said first substrate having a plan surface of a substantially circular shape with a predetermined diameter and a peripheral edge and said second substrate having a plan surface of a substantially circular shape with a diameter larger than said predetermined diameter and a peripheral edge;

forming an electrode having a predetermined pattern on the surface of each of the substrates;

forming, on the surface provided with the electrode of the second substrate, a sealing material layer having a predetermined width and height and extending along the peripheral edge of the substrate;

disposing the substrates one above the other through the sealing material layer in a predetermined relative position, with the surfaces provided with the electrodes facing each other, and with the peripheral edge of the first substrate being positioned within the range of said predetermined width of the sealing material layer, to form a substrate assembly;

heating said substrate assembly to cause the sealing material layer to extend over a portion of the peripheral edge of said first substrate and to extend to a position not beyond the peripheral edge of the second substrate; and injecting liquid crystal into a space defined by the substrates and the sealing material layer.

12. A method as claimed in claim 11, wherein said sealing material layer is formed so that the peripheral edge of the first substrate is positioned outwardly from the center of said predetermined width of the sealing material layer within the range of said predetermined width.

13. A method as claimed in claim 11 or 12, wherein said sealing material layer forming step includes a step of containing, in the sealing material, a spacer member for ensuring said spacing between the substrates.

14. A method as claimed in claim 1, wherein upon heating said substrate assembly, said sealing material layer moves outwardly over said specific portion to a position not beyond the peripheral edge of said specific portion.

15. A method as claimed in claim 4, wherein upon heating said substrate assembly a portion of said sealing material layer moves outwardly over said specific portion to a position not beyond the specific side of said specific portion.

16. A method as claimed in claim 11, wherein upon heating said substrate assembly, an outer portion of said sealing material layer extends outwardly over said second substrate to a position not beyond the peripheral edge of said second substrate.

17. A method for fabricating a liquid crystal display element having a first substrate, a second substrate arranged below the first substrate and a sealing material disposed at peripheral portions of the first and second substrates with at least a portion of the sealing material being interposed between the second and first substrates for providing a hermetically sealed envelope together with the substrates, said method comprising the steps of:

preparing said first and second substrates with each substrate having a predetermined shape and a peripheral edge;

forming an electrode having a predetermined pattern on the opposing surfaces of each of the substrates;

providing on at least one of the opposing surfaces of said first and second substrates, a sealing material layer having a predetermined width and height and extending along a peripheral edge of one of the first and second substrates;

disposing the substrates with one above the other and in contact with the sealing material layer with the surfaces provided with said electrodes opposing and facing each other and with the peripheral edge of one of said substrates being arranged at a position within the predetermined width of said sealing material layer formed on the other substrate and the other substrate having at least one specific portion extending outwardly beyond the peripheral edge of the one substrate to form a substrate assembly;

heating said substrate assembly to cause the sealing material layer to melt and to extend over a portion of the peripheral edge of the one substrate and to extend to a position not beyond the peripheral edge of the other substrate; and injecting liquid crystal material into a space defined between the first and second substrates and the sealing material layer.

* * * * *